United States Patent
Grimsrud

(10) Patent No.: US 7,451,353 B2
(45) Date of Patent: Nov. 11, 2008

(54) CACHE DISASSOCIATION DETECTION

(75) Inventor: Knut S. Grimsrud, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 495 days.

(21) Appl. No.: 11/317,779

(22) Filed: Dec. 23, 2005

(65) Prior Publication Data

US 2007/0220210 A1    Sep. 20, 2007

(51) Int. Cl.
*G06F 11/00* (2006.01)
(52) U.S. Cl. .......... 714/42; 711/113
(58) Field of Classification Search .......... 714/42; 711/113, 141
See application file for complete search history.

(56) References Cited

U.S. PATENT DOCUMENTS

| | | | | |
|---|---|---|---|---|
| 5,829,019 A | * | 10/1998 | Thompson et al. | 711/113 |
| 5,931,951 A | * | 8/1999 | Ando | 713/324 |
| 6,128,627 A | * | 10/2000 | Mattis et al. | 707/202 |
| 6,675,264 B2 | * | 1/2004 | Chen et al. | 711/141 |
| 2002/0194440 A1 | * | 12/2002 | Ghosh et al. | 711/156 |
| 2004/0030850 A1 | * | 2/2004 | Plappert | 711/159 |
| 2005/0007838 A1 | * | 1/2005 | Makela et al. | 365/199 |
| 2005/0257097 A1 | * | 11/2005 | Jarvis et al. | 714/42 |
| 2006/0041769 A1 | * | 2/2006 | Hu et al. | 713/324 |
| 2006/0224824 A1 | * | 10/2006 | Chen | 711/113 |
| 2007/0156876 A1 | * | 7/2007 | Sundarrajan et al. | 709/223 |
| 2007/0156954 A1 | * | 7/2007 | Trika et al. | 711/113 |
| 2008/0082757 A1 | * | 4/2008 | Ahmad et al. | 711/141 |

OTHER PUBLICATIONS

"International Search Report & Written Opinion," International Application No. PCT/US2006/046893, mailed Jun. 19, 2007, 10 pgs.

* cited by examiner

*Primary Examiner*—Bryce P Bonzo
(74) *Attorney, Agent, or Firm*—Robert D. Anderson

(57) ABSTRACT

In some embodiments an expected value is compared with a number of times a storage device has been powered up and/or spun up. A cache disassociation is detected in response to the comparing. Other embodiments are described and claimed.

51 Claims, 3 Drawing Sheets

CACHE DISASSOCIATION DETECTION

TECHNICAL FIELD

The inventions generally relate to detection of cache disassociation.

BACKGROUND

Cache memory is typically random access memory (RAM) that a computer processor can access more quickly than regular RAM. For example, recently accessed data and/or frequently accessed data may be stored in the cache. As the processor processes data and needs data from the regular larger RAM, it looks first in the cache memory to determine if the data is in the cache. If it is in the cache, the processor does not need to do a more time consuming read operation to access data from the larger memory. In a similar manner, cache memory may also be used to provide faster access to data stored on a mass storage device (or bulk storage device) such as a disk drive, an optical drive, a tape drive, etc. For example, it has been suggested to augment disk drives with flash memory as part of a non-volatile (NV) cache solution in a manner such that the cache (for example, non-volatile flash memory) would be included with the disk drive itself.

It is believed that a better solution than providing a cache as part of the mass storage device (for example, a hard disk drive) is to provide a non-volatile (NV) cache memory using platform-based technology. One example of a platform-based cache solution is to provide a cache that is not a part of the mass storage device but is included on the host platform. Consolidating the cache in the platform (for example, instead of having lots of smaller caches on each storage device) allows the one consolidated cache to provide service to all of the storage devices. Further, by being more closely integrated with the platform, the non-volatile storage cache also can be used more readily for other platform services (for example, shared with the BIOS, etc). One argument that has previously been raised as to why such a platform-based solution is not an attractive alternative is because the non-volatile cache can become separated from the mass storage device (for example, a disk drive). This separation between the cache and the storage device is referred to as cache disassociation. For example, the storage device may be transferred from one platform to another platform and then back to the original platform, or the storage device might be accessed by a different Operating System (OS) (for example, Linux) on a platform and then accessed by the first Operating System (OS) (for example, Windows) again. In such a scenario, there is a potential, for example, for disk drive corruption and/or incoherent cache contents when the disassociation and/or re-association occurs between the storage device and the platform.

One previous solution for cache disassociation detection is for the contents of the disk drive to be scrambled in such a way that if the drive were moved to a different system (platform) it would not function without special tools to unscramble the contents. Disassociation was detected when the drive contents were not scrambled as expected. However, this type of solution creates new encumbrances and requires special tools for handling typical Information Technology (IT) service methods. For example, when a laptop fails, an IT technician may want to transfer the hard drive to a new loaner laptop while the original laptop is serviced. The additional new tools and methods required by the previous solution described above make such a transfer a much more cumbersome process. Therefore, a need has arisen for detecting whether cache disassociation has occurred in a manner which eliminates this type of cumbersome requirements and is equally reliable in detecting disassociation. If cache disassociation were detected then steps could be taken to properly restore cache coherency.

BRIEF DESCRIPTION OF THE DRAWINGS

The inventions will be understood more fully from the detailed description given below and from the accompanying drawings of some embodiments of the inventions which, however, should not be taken to limit the inventions to the specific embodiments described, but are for explanation and understanding only.

DETAILED DESCRIPTION

Figure 1:
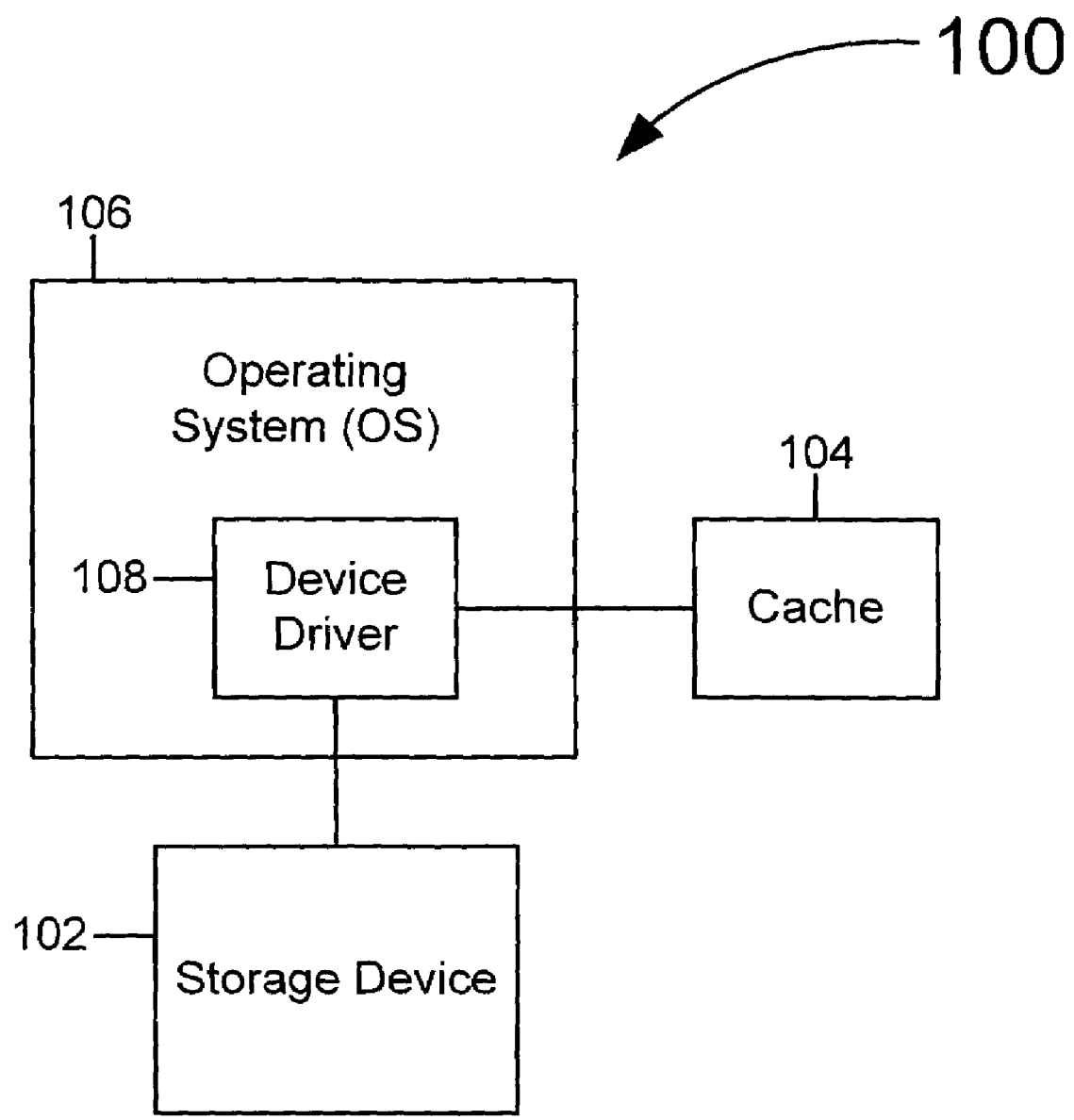
FIG. 1 illustrates a system detecting cache disassociation according to some embodiments of the inventions.

Some embodiments of the inventions relate to detection of cache disassociation.

In some embodiments an expected value is compared with a number of times a storage device has been powered up and/or spun up. A cache disassociation is detected in response to the comparing.

In some embodiments a system includes a platform including a cache, a storage device coupled to the platform, a comparator to compare a number of times the storage device has been spun up and/or powered up with an expected value, and a detector to detect a disassociation between the cache and the storage device in response to an output of the comparator.

In some embodiments an apparatus includes a comparator to compare a number of times a storage device has been spun up and/or a number of times the storage device has been powered up with an expected value, and a detector to detect a cache disassociation in response to an output of the comparator.

In some embodiments an article includes a computer readable medium having instructions thereon which when executed cause a computer to compare a number of times a storage device has been powered up and/or spun up with an expected value, and to detect a cache disassociation in response to the comparison.

Cache disassociation can occur according to some embodiments when a storage device such as a disk drive is booted in an environment where the cache (for example, non-volatile cache or NV cache) and the storage device (for example, disk drive) are physically and/or logically separated. This can occur, for example, by booting to a different Operating System (OS) that is not cache aware on the same platform (logical separation), and/or by booting to the drive on a different physical platform (physical separation), and/or by booting to the same OS but in a situation where the cache device driver is not loaded into the OS for some reason (logical separation). In such a situation the storage device becomes separated from the cache, for example, by a physical separation to a different physical platform and/or by a logical separation to a different operating environment that does not keep the cache and the storage device coherent.

According to some embodiments a storage device (for example, a hard disk drive) cannot be made incoherent with the non-volatile cache without the storage device being powered up and/or spun up, since the contents of the storage device cannot be changed without a power-up or spin-up of the storage device happening first. For example, according to some embodiments, if the storage device (for example, hard disk drive) were moved around to different systems without powering up the storage device first, then disassociation could not have actually happened since the contents of the storage device could not have been changed.

According to some embodiments, since cache disassociation is directly associated with booting in a different environment, it is possible to detect when this has occurred by determining the number of times the drive has been booted up or spun up (for example, the number of times the drive has had start and/or stop cycles) and/or the number of times the drive has been powered up (for example, the number of times power has been applied to the drive), and then verifying that this number matches what the cache manager (for example, the cache device driver) expects the number to be. According to some embodiments, it is important that this be done in a way that requires no cooperation from the other operating environments since the detecting device likely has no control over what those other operating environments might do.

According to some embodiments System Monitoring and Reporting Technology (SMART) may be used. SMART is a technology used by ATA disk drives (both regular parallel ATA disk drives and modern Serial ATA disk drives). SMART technology is typically used for predictive failure analysis and diagnostics purposes. Parameters that the SMART technology can be used to record within the disk drive include the number of times the drive has spun up and/or powered up for the life of the drive. ATA disk drives (regular parallel ATA disk drives and Serial ATA disk drives) commonly tally a SMART parameter that records the number of times that the disk drive device has been powered up and/or spun up for the life of the disk drive. As long as the drive remains associated with the cache (for example NV cache), the cache driver can record the value of this SMART parameter at each power-up and/or spin-up, and expect that number to have a value that is one greater than the previously recorded value, for example. According to some embodiments, the drive serial number and/or a GUID (Global Unique Identfier) and/or other identifying traits are also matched to ensure that it is the same drive. According to some embodiments, if the SMART power-up and/or spin-up value is greater than one more than the previously recorded value, then the drive has been powered up and/or spun up in an environment where the driver did not record the power-up and or spin-up occurrence. The cache driver (and/or cache manager) can then make a worst-case assumption that the drive has been powered up and/or spun up in a different environment and has potentially been modified, rendering the contents of the cache suspect. Therefore, cache disassociation detection has been made.

According to some embodiments, the spin-up value and/or the power-up value is described herein as being "one" more, etc. Although this is true in some embodiments, it is not true for all embodiments. According to some embodiments, the expected number (expected value) can be any value (for example, a known and fixed number or a known and fixed increase value). According to some embodiments, for example, in the process of a normal shutdown the system might perform an operation that ends up increasing the spin-up and/or power-up number such that the expected value at the next power up is two greater for the normal case, for example. According to some embodiments, the expected value (and/or increase value) is any predetermined and known fixed value. For example, according to some embodiments a fixed increase value might typically be one, but is not constrained to be one and could be some other value in some predetermined cases (and/or in some predetermined systems).

According to some embodiments, detection is made (for example by a cache manager and/or a cache device driver) as to whether a drive has been powered up and/or spun up in a different environment (for example, on a different platform, or on the same platform but without the driver loaded). According to some embodiments, this detection is made by checking the SMART parameter to determine how many times the storage device (for example, disk drive) has been spun up (for example, booted) and/or has been powered up, and/or a combination of how many times the storage device has been spun up and/or powered up. If the number of times is not consistent with an expected number (for example, the number expected by a cache manager and/or a cache device driver), then a detection of cache disassociation is made. For example, in some embodiments, if the cache manager and/or cache device driver determines that the expected number is different than the number provided from the storage device (for example, the SMART parameter), then the manager and/or driver knows that the storage device has been booted, powered up, and/or spun up, etc. in an environment where the associated manager/driver was not loaded (for example, either physical separation or logical separation) and can take steps necessary to recover and invalidate any incoherent cached data.

According to some embodiments, a SMART parameter (for example of an ATA disk drive such as a parallel ATA disk drive, a Serial ATA disk drive, etc.) is used to obtain an expected count value and/or an increase in an expected count value. However, according to some embodiments a SMART parameter is not necessary. According to some embodiments, a method may be used to obtain an expected value other than using a SMART parameter. According to some embodiments, any type of count of a number of storage device spin-ups and/or power-ups may be used.

According to some embodiments, once disassociation has been detected, it is possible to begin steps necessary for guaranteeing that no corruption (for example, drive corruption) occurs with respect to the storage device. For example, a cache device driver can eliminate the potential for storage device corruption (for example, drive corruption) and/or incoherent cache contents when disassociation and/or re-association have occurred based on a detection that disassociation has occurred. According to some embodiments, once disassociation has been detected, any incoherent cached data may be recovered and/or invalidated.

According to some embodiments, cache disassociation detection is performed partially or completely in software. According to some embodiments, cache disassociation detection is performed partially or completely in firmware. According to some embodiments, cache disassociation detection is performed partially or completely in software and/or in firmware. According to some embodiments, cache disassociation detection is performed partially or completely in hardware (and/or in software and/or firmware). According to some embodiments, cache disassociation detection is performed partially or completely within driver algorithms used for managing a platform-based cache (for example, a non-volatile cache).

According to some embodiments, cache disassociation detection is performed partially or completely within a cache manager. According to some embodiments, cache disassociation detection is performed partially or completely within a cache device driver (for example, which is loaded into an Operating System). According to some embodiments, cache disassociation detection is integrated as part of an Operating System (OS) operation. According to some embodiments, cache disassociation detection is performed partially or completely within a chipset. According to some embodiments, cache disassociation detection is performed partially or completely within a processor.

FIG. 1 illustrates a system 100 detecting cache disassociation according to some embodiments. System 100 includes a storage device 102, a cache 104, and an Operating System (OS) 106. OS 106 includes a cache device driver 108 that can be used to perform detection of disassociation between the storage device 102 and the cache 104 according to some embodiments. According to some embodiments, cache device driver 108 detects whether a drive has been powered up and/or spun up in a different environment (for example, on a different platform, or on the same platform but without the driver loaded). According to some embodiments cache 104 and OS 106 are part of a computer platform (or computer system). According to some embodiments, cache 104 may be, for example, a non-volatile (NV) random access memory (RAM) on a motherboard. In some embodiments cache 104 is non-volatile cache. In some embodiments cache 104 is non-volatile RAM. In some embodiments cache 104 is flash memory. The cache device driver 108 can detect whether storage device 102 has been powered up (for example, booted up) and/or spun up in a different environment than the OS 106. This is implemented by determining the number of times the storage device 102 has been powered up and/or spun up, and verifying that this number matches a value that the cache manager included in the cache device driver 108 expects. For example, this may be implemented using SMART technology that is typically used for predictive failure analysis and diagnostics purposes for the storage device. In this manner the cache device driver 108 can determine, for example, if the storage device has been powered up and/or spun up on a different platform, on a different OS, and/or on the same platform but without the cache device driver loaded. Although cache device driver 108 has been illustrated in FIG. 1 as being loaded into OS 106, it is not limited to an OS in some embodiments. Additionally, in some embodiments the functionality of cache device driver 108 may be implemented in other ways (for example, in a cache manager which is part of a cache device driver, in a cache manager that is not part of a cache device driver, in software, in firmware, and/or in hardware, etc.)

Figure 2:
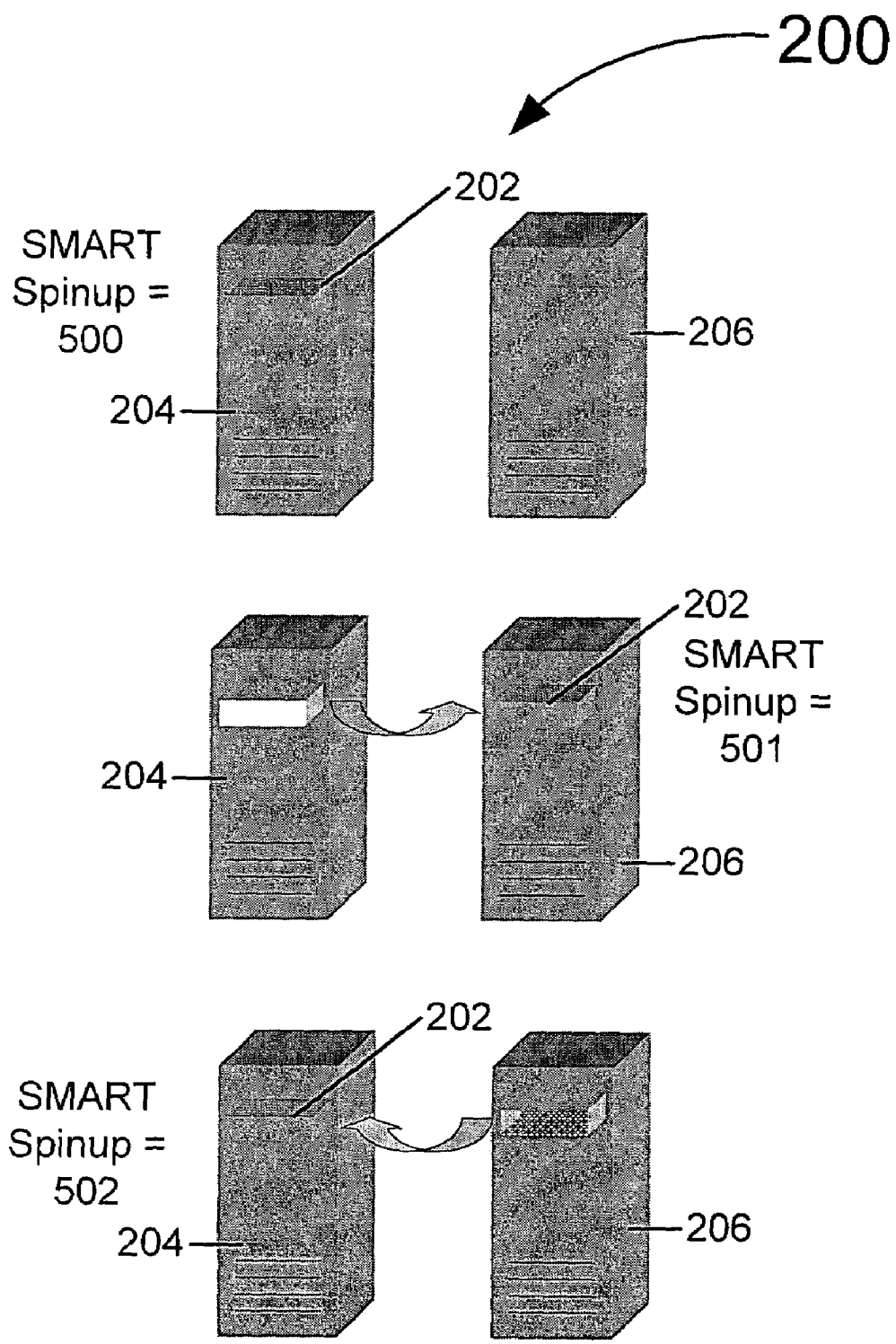
FIG. 2 illustrates an explanation of a storage device being moved between platforms according to some embodiments of the inventions.

FIG. 2 illustrates an pictorial explanation 200 of a storage device 202 being moved between systems 204 and 206 according to some embodiments. The top row in FIG. 2 illustrates storage device 202 resident within system 204. When system 204 is powered up and/or spun up a value is incremented. For example, according to some embodiments a value such as a SMART parameter (for example, a SMART spin-up number and/or a SMART power-up number) is incremented (for example, to "500" if it is the $500^{th}$ time the storage device 202 has been powered up and/or spun up). The second row in FIG. 2 illustrates the storage device 202 being removed from system 204 and inserted into system 206. Once the storage device 202 is powered up and/or spun up in system 206 the SMART parameter (for example, a SMART spin-up number and/or a SMART power-up number) is incremented (for example, to "501" since it is now the $501^{st}$ time the storage device 202 has been powered up and/or spun up). The bottom row in FIG. 2 illustrates the storage device 202 being removed from system 206 and inserted back into system 204. Once the storage device 202 is then powered up and/or spun up in system 204 the SMART parameter of the storage device 202 (for example, a SMART spin-up number and/or SMART power-up number) is incremented (for example, to "502" since it is now the $502^{nd}$ time the storage device 202 has been powered up and/or spun up). According to some embodiments, a cache disassociation detection mechanism (for example, implemented partially or completely within a cache device driver such as cache device driver 108 illustrated in FIG. 1) is used to compare the SMART parameter (502) with an expected value (for example a value stored within platform 204). In the example illustrated in FIG. 2 the expected value would be "501", for example (that is, one greater than the SMART parameter of 500 from the last time storage device 202 was powered up and/or spun up within platform 204). The detection mechanism (or detector) would include a comparison mechanism (or comparator) to compare the SMART parameter of storage device 202 (that is, "502") with the expected value of "501" (one greater than "500", for example), and the detector would detect cache disassociation since the expected value and the actual SMART parameter do not match.

Figure 3:
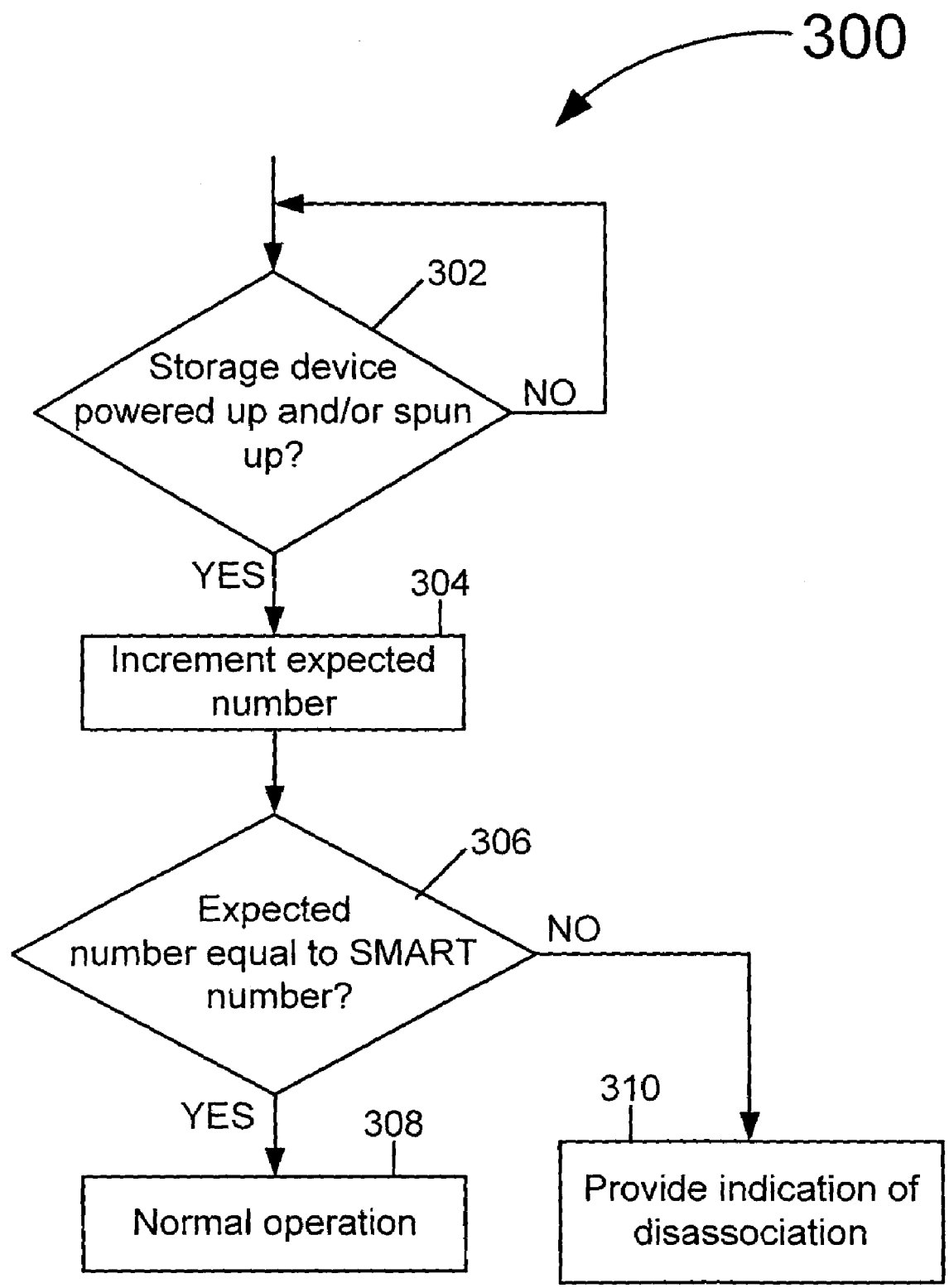
FIG. 3 illustrates a flowchart showing cache disassociation detection according to some embodiments of the inventions.

FIG. 3 illustrates a flowchart 300 showing cache disassociation detection according to some embodiments. At 302 flowchart 300 makes a determination of whether a storage device (such as a disk drive) has been powered up and/or spun up. If not, then flow returns to 302 to wait until the storage device has been powered up and/or spun up. Once 302 determines that the storage device has been powered up and/or spun up then an expected number is incremented at 304. At 306 a determination is made as to whether or not the incremented expected number is equal to a SMART number of the storage device (for example, SMART parameter or any other number identifying a number of times the storage device has been powered up and/or spun up). If the incremented expected number is equal to the number associated with the number of times that storage has powered up and/or spun up (for example, SMART parameter) at 306 then normal operation of the storage device occurs at 308. If the incremented expected number is not equal to the number associated with the storage device at 306 then an indication of cache disassociation is provided at 310. According to some embodiments, once an indication of cache disassociation has been provided (for example, as at 310) then operations are performed for eliminating the potential for storage device corruption and incoherent cache contents (for example, when disassociation/re-association occurs). In some embodiments the flowchart 300 can include a step to compare an identifying characteristic of the storage device (for example, a serial number of the storage device and/or other identifying traits of the storage device) in order to ensure that the correct storage device parameters are being compared (that is, for example, the expected value and the SMART parameter both are associated with the same storage device). This additional comparison (or comparator) to identify that the same and correct storage device is being referred to could be included, for example, prior to 302 in flowchart 300. In various embodiments the flowchart 300 operation can be implemented partially or completely in software, firmware, and/or hardware. In some embodiments the flowchart 300 operation can be implemented partially or completely in a cache manager, in a cache device driver, in a chipset, anywhere in a same platform in which the cache memory is resident for which cache disassociation is being detected, and/or in a processor. According to some embodiments, the flowchart 300 operation is performed partially or completely by code stored on a flash memory device or devices.

Although some embodiments have been described in reference to one or more hard disk drives, disk drives, optical drives, tape drives, bulk storage devices, mass storage devices, etc., and some of these terms may even have been used interchangeably, it is noted that various embodiments may be implemented with any type of storage device or storage devices, and the present invention and/or embodiments of the present invention should not be limited to a particular type of storage device or storage devices.

Although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, the interfaces that transmit and/or receive signals, etc.), and others.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Although flow diagrams and/or state diagrams may have been used herein to describe embodiments, the inventions are not limited to those diagrams or to corresponding descriptions herein. For example, flow need not move through each illustrated box or state, or in exactly the same order as illustrated and described herein.

The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method comprising:
   comparing a number of times a storage device has been powered up with an expected value; and
   detecting a cache disassociation in response to the comparing.

2. The method of claim 1, further comprising comparing the number of times the storage device has been spun up with a second expected value, wherein the detecting is performed in response to the comparison of the number of times the storage device has been powered up with the expected value and wherein the detecting is performed in response to the comparison of the number of times the storage device has been spun up with the second expected value.

3. The method of claim 1, wherein the comparing compares the number of times the storage device has been powered up plus a number of times the storage device has been spun up with the expected value.

4. The method of claim 1, wherein the storage device is a mass storage device.

5. The method of claim 4, wherein the mass storage device is at least one of a disk drive, an optical drive, and a tape drive.

6. The method of claim 1, wherein the storage device is a disk drive, and wherein the number of times the storage device has been powered up is determined based on a System Monitoring and Reporting Technology parameter.

7. The method of claim 2, wherein the storage device is a disk drive, and wherein the number of times the storage device has been powered up is determined based on a first System Monitoring and Reporting Technology parameter and the number of times the storage device has been spun up is determined based on a second System Monitoring and Reporting Technology parameter.

8. The method of claim 3, wherein the storage device is a disk drive, and wherein the number of times the storage device has been powered up plus the number of times the storage device has been spun up is determined based on a System Monitoring and Reporting Technology parameter.

9. The method of claim 1, wherein the detecting detects a cache disassociation if the number of times the storage device has been powered up is greater than a predetermined value more than the expected value.

10. The method of claim 1, wherein the detecting detects a cache disassociation if the number of times the storage device has been powered up is not equal to a predetermined value more than the expected value.

11. The method of claim 1, further comprising determining a match between the storage device and the expected value and performing the comparing and detecting in response to the determining.

12. The method of claim 11, wherein the determining compares a global unique identifier of the storage device with an expected global unique identifier of the storage device.

13. The method of claim 11, wherein the determining compares a serial number of the storage device with an expected serial number of the storage device.

14. A method comprising:
comparing a number of times a storage device has been spun up with an expected value; and
detecting a cache disassociation in response to the comparing.

15. The method of claim 14, wherein the storage device is a mass storage device.

16. The method of claim 15, wherein the mass storage device is at least one of a disk drive, an optical drive, and a tape drive.

17. The method of claim 14, wherein the storage device is a disk drive, and wherein the number of times the storage device has been spun up is determined based on a System Monitoring and Reporting Technology parameter.

18. The method of claim 14, wherein the detecting detects a cache disassociation if the number of times the storage device has been spun up is greater than a predetermined value more than the expected value.

19. The method of claim 14, wherein the detecting detects a cache disassociation if the number of times the storage device has been spun up is not equal to a predetermined value more than the expected value.

20. The method of claim 14, further comprising determining a match between the storage device and the expected value and performing the comparing and detecting in response to the determining.

21. The method of claim 20, wherein the determining compares a global unique identifier of the storage device with an expected global unique identifier of the storage device.

22. The method of claim 20, wherein the determining compares a serial number of the storage device with an expected serial number of the storage device.

23. A system comprising:
a platform including a cache;
a storage device coupled to the platform;
a comparator to compare a number of times the storage device has been spun up or a number of times the storage device has been powered up with an expected value; and
a detector to detect a disassociation between the cache and the storage device in response to an output of the comparator.

24. The system of claim 23, wherein the comparator and the detector are included in the platform.

25. The system of claim 23, wherein the cache stores frequently accessed data contents and/or recently accessed data contents of the storage device.

26. The system of claim 23, wherein the comparator compares the number of times the storage device has been powered up with the expected value.

27. The system of claim 23, wherein the comparator compares the number of times the storage device has been spun up with the expected value.

28. The system of claim 23, wherein the comparator compares the number of times the storage device has been powered up plus the number of times the storage device has been spun up with the expected value.

29. The system of claim 23, wherein the comparator compares the number of times the storage device has been powered up with the expected value and the number of times the storage device has been spun up with a second expected value.

30. The system of claim 23, wherein the cache is a nonvolatile cache.

31. The system of claim 23, wherein the comparator and the detector are included in a flash memory device.

32. An apparatus comprising:
a comparator to compare a number of times a storage device has been spun up or a number of times the storage device has been powered up with an expected value; and
a detector to detect a cache disassociation in response to an output of the comparator.

33. The apparatus of claim 32, wherein the comparator compares the number of times the storage device has been powered up with the expected value.

34. The apparatus of claim 32, wherein the comparator compares the number of times the storage device has been spun up with the expected value.

35. The apparatus of claim 32, wherein the comparator compares the number of times the storage device has been powered up plus the number of times the storage device has been spun up with the expected value.

36. The apparatus of claim 32, wherein the comparator compares the number of times the storage device has been powered up with the expected value and compares the number of times the storage device has been spun up with a second expected value.

37. The apparatus of claim 32, wherein the storage device is a mass storage device.

38. The apparatus of claim 37, wherein the mass storage device is at least one of a disk drive, an optical drive, and a tape drive.

39. The apparatus of claim 33, wherein the storage device is a disk drive, and wherein the number of times the storage device has been powered up is determined based on a System Monitoring and Reporting Technology parameter.

40. The apparatus of claim 34, wherein the storage device is a disk drive, and wherein the number of times the storage device has been spun up is determined based on a System Monitoring and Reporting Technology parameter.

41. The apparatus of claim 35, wherein the storage device is a disk drive, and wherein the number of times the storage device has been powered up plus the number of times the storage device has been spun up is determined based on a System Monitoring and Reporting Technology parameter.

42. The apparatus of claim 36, wherein the storage device is a disk drive, and wherein the number of times the storage device has been powered up is determined based on a first System Monitoring and Reporting Technology parameter and the number of times the storage device has been spun up is determined based on a second System Monitoring and Reporting Technology parameter, and wherein the comparator compares the first parameter with the expected value and compares the second parameter with the second expected value.

43. The apparatus of claim 36, wherein the storage device is a disk drive, and wherein the number of times the storage device has been powered up is determined based on a first System Monitoring and Reporting Technology parameter and the number of times the storage device has been spun up is determined based on a second System Monitoring and Reporting Technology parameter.

44. The apparatus of claim 32, further comprising a second comparator to determine a match between the storage device and the expected value, the comparator and the detector responsive to an output of the second comparator.

45. The apparatus of claim 44, wherein the second comparator is to compare a global unique identifier of the storage device with an expected global unique identifier of the storage device.

46. The apparatus of claim 44, wherein the second comparator is to compare a serial number of the storage device with an expected serial number of the storage device.

47. An article comprising:
a computer readable medium having instructions thereon which when executed cause a computer to:
compare a number of times a storage device has been powered up or spun up with an expected value; and
detect a cache disassociation in response to the compare.

48. The article of claim 47, wherein the compare compares the number of times the storage device has been powered up with the expected value.

49. The article of claim 47, wherein the compare compares the number of times the storage device has been spun up with the expected value.

50. The article of claim 47, wherein the compare compares the number of times the storage device has been powered up plus the number of times the storage device has been spun up with the expected value.

51. The article of claim 47, wherein the compare compares the number of times the storage device has been powered up with the expected value and the number of times the storage device has been spun up with a second expected value.

* * * * *